March 30, 1971  J. W. LANE ET AL  3,573,102

FUEL CELL GAS MANIFOLD SYSTEM

Filed Nov. 7, 1966  2 Sheets-Sheet 1

INVENTORS
JOHN W. LANE
JOHN H. HIRSCHENHOFER
RAYMOND L. GELTING

BY *Finnegan & Henderson*
ATTORNEYS

INVENTORS
JOHN W. LANE
JOHN H. HIRSCHENHOFER
RAYMOND L. GELTING

BY *Finnegan & Henderson*
ATTORNEYS

United States Patent Office 3,573,102
Patented Mar. 30, 1971

3,573,102
FUEL CELL GAS MANIFOLD SYSTEM
John W. Lane, John H. Hirschenhofer, and Raymond L. Gelting, Manchester, Conn., assignors to United Aircraft Corporation, East Hartford, Conn.
Filed Nov. 7, 1966, Ser. No. 592,420
Int. Cl. H01m 27/02
U.S. Cl. 136—86    13 Claims

ABSTRACT OF THE DISCLOSURE

A manifold system for distributing the flow of reactant gases through a fuel cell to prevent a drying out of the cell. The fuel cell includes a fuel electrode, an oxidant electrode, and an aqueous electrolyte retentive matrix located between the electrodes. The manifold system includes a gas chamber for distributing the flow of at least one of the reactant gases over the surface of its electrode in a circuitous path between the inlet and outlet of the chamber. The inlet and outlet ends of the chamber are located closely adjacent to each other with respect to the path followed by the gas flowing through the chamber so that the driest and wettest regions of the cell near the inlet and outlet ends, respectively, of the chamber are close together to prevent a drying-out of the cell.

---

This invention relates to fuel cells and, more particularly, to a manifold system for distributing the flow of reactant gases through a fuel cell to prevent "drying-out" of the cell.

In conventional fuel cells, an aqueous solution of an electrolyte is located between and in contact with a pair of porous electrodes that are exposed to fuel and oxidant reactant gas streams, respectively.

One type of fuel cell which operates on the reaction of fuel and oxidant reactant gases is the "trapped-electrolyte" cell in which the electrolyte is enclosed or trapped within a confined area between the electrodes of the cell. This trapped electrolyte transfers ions formed in the electrode reactions between the electrodes.

In compact, trapped-electrolyte fuel cells, the electrolyte solution is held within a porous matrix between the electrodes and within the porous electrodes themselves by capillary forces. The interface between the electrolyte and the oxidant reactant gas and the interface between the electrolyte and the fuel reactant gas are located within the oxidant and fuel electrodes, respectively, with the particular locations of these interfaces being determined by the concentration of the electrolyte. The maintenance of each gas-electrolyte interface within its respective electrode prevents direct gas-to-gas contact between the reactant gases in the cell.

In the operation of such a fuel cell, a fuel gas, for example hydrogen, is supplied to the fuel electrode by suitable gas supply means and an oxidant gas, for example oxygen or air, is simultaneously supplied to the oxidant electrode by suitable oxidant gas supply means. The oxygen reacts with the water of the electrolyte of the oxidant electrode of the cell (the cathode) accepting electrons and forming negatively charged hydroxyl ions. These ions migrate through the aqueous electrolyte to the fuel electrode of the cell (the anode) where they react with the hydrogen supplied to that electrode. The reaction at the anode forms water, with the evolution of heat and the release of electrons.

The electrons generated at the anode travel through an external circuit electrically connected between the electrodes, producing the desired current flow of the cell. The overall cell reaction may be summarized as follows:

$$(H_2 + \tfrac{1}{2} O_2 \rightarrow H_2O + \text{electrical energy} + \text{heat})$$

The excess water produced in the cell reaction must be continuously removed from the trapped-electrolyte fuel cell system to maintain the aqueous electrolyte solution at a uniform concentration throughout the cell. Conventionally, this excess product water is removed either by evaporating it into the oxidant gas stream passing through an oxidant gas chamber adjacent the cathode of the cell or by evaporating it into an excess fuel gas stream recirculated through a fuel gas chamber adjacent the anode of the cell.

If the electrolyte concentration in the cell is maintained at a constant value by removing product water, both of the gas-electrolyte interfaces will remain within the cell electrodes thus maintaining the required separation between the reactant gases. However, if too much water is removed by the gas stream adjacent one of the cell electrodes, a drying-out of the cell will occur and the gas-electrolyte interface will be pulled out of its electrode and into the body of the cell. This movement of the interface will eventually destroy the separation of the gas reactants. When the electrolyte is no longer capable of separating the two reactant gases, a gas crossover occurs. The reaction then proceeds as a gas-to-gas reaction with no generation of current and with a severe overheating of the cell.

An opposite problem from drying-out of the cell is cell flooding. If an insufficient amount of product water is removed from the cell in the reactant gas stream, the electrolyte will become diluted and the cell may be flooded. Thus, dilution of the electrolyte forces the gas-electrolyte interface through the porous electrode and into the gas chambers surrounding the electrodes. This spilling over and consequent loss of the electrolyte reduces the performance of the cell.

To control the electrolyte concentration and ensure satisfactory operation of the cell, it is therefore necessary to accurately control the water balance in the cell by controlling the rate of removal of the product water.

In a conventional hydrogen-air fuel cell, product water is removed from the cell in the oxygen depleted air stream that flows through the oxidant gas chamber of the cell supplying oxygen to the oxidant electrode. While normal atmospheric air is desirable as the oxidant reactant gas in such a fuel cell, it is too dry and rapidly dehydrates the cell by removing product water at too rapid a rate, thereby undesirably altering the location of the electrolyte-gas interface. As the relatively dry air passes through the cell, it creates a higher evaporation rate of the product water near the gas inlet than near the outlet, due to the accumulation of absorbed water in the air as it passes through the cell. This variation in absorption rate creates a "drying" near the cell inlet and a "wetting" near the cell outlet, and a resulting electrolyte concentration gradient across the cell. Depending on the severity of this concentration gradient, the drying of the cell at the inlet can cause the gas-electrolyte interface to retreat into the fuel cell from its position within the electrode, thereby reducing the performance of the cell and eventually destroying the liquid separation of the gas reactants.

To prevent this local drying near the cell inlet, it has generally been necessary to increase the humidity of the air before it enters the cell. Conventionally, a saturator is placed in the air feed lines to supply the necessary moisture to the air. As the air leaves the saturator it is circulated through the air chamber within the cell, where it absorbs heat and water and leaves the cell at an elevated temperature. The temperature and humidity of the air leaving the saturator must be controlled to prevent a drying-out of the cell inlet.

Further, a cell temperature gradient must be established and controlled across the cell so that only product water is removed by the air stream. Conventionally, means are provided for circulating liquid coolant through hollow coolant plates in the cell to control cell temperature gradients.

While such saturators effectively prevent local drying of the fuel cell inlet, they also undesirably add to the weight, complexity and cost of the fuel cell system, since they require not only a source of water but complex control and cooling systems necessary to maintain the temperature gradient across the cell.

A similar prior art method which has been used for removing product water from a hydrogen-pure oxygen fuel cell comprises recirculating excess hydrogen through the cell, where the hydrogen is heated and absorbs product water formed in the cell. The humidity of the recirculated hydrogen gas stream is controlled to prevent a drying-out of the cell inlet. The humidity is thus regulated so that the partial pressure of water vapor in the hydrogen equals the partial pressure of water in the electrolyte at the cell inlet. Since this method removes product water by establishing a temperature gradient across the cell, and this temperature gradient is controlled by a flow of coolant through the cell, or the like, this method necessarily includes the complex controls needed in the hydrogen-air fuel cells equipped with saturators.

It can be readily seen from the foregoing that it would be highly desirable to utilize dry reactant gases and particularly dry atmospheric air that has not been conditioned to increase its humidity (sometimes referred to herein as ambient unconditioned air) as the oxidant gas stream to a fuel cell. It is also desirable at the same time to eliminate the need for additional control equipment and humidifying apparatus, thereby reducing the total weight of the system and achieving more simplified and efficient cell operation. Such a fuel cell system using hydrogen and oxygen as the reactant gas streams would be particularly advantageous in space vehicle systems where it is most desirable to reduce the weight, cost and complexity of the operating power systems.

Accordingly, it is a primary object of this invention to provide a fuel cell system that can effectively operate on dry reactant gas which removes product water without drying out the cell.

Another object of this invention is to provide a fuel cell that can effectively operate on dry oxidant gas, such as dry or ambient air, without the necessity of controlling the humidity or temperature of the gas as it passes through the fuel cell.

It is a further object of this invention to reduce the total weight of a fuel cell system, to simplify its operation, to reduce its costs of construction, and to increase the overall efficiency of the fuel cell.

Still another object of this invention is to provide for a more uniform electrolyte concentration in a compact fuel cell utilizing dry or ambient unconditioned air as the oxidant reactant gas.

Yet another object of this invention is to eliminate the need for saturators in hydrogen-air fuel cell systems.

A still further object of this invention is to eliminate the need for establishment of restrictive and oriented temperature gradients across hydrogen-air or hydrogen-oxygen fuel cells, and to make the establishment of such gradients unnecessary to the removal of water from the cell.

Another object of this invention is to provide a manifold system for the distribution of unconditioned dry oxidant reactant gas through a fuel cell to prevent local drying near the cell inlet and local wetting near the cell outlet of a fuel cell, and to maintain a substantially uniform electrolyte concentration in the cell.

A further object of this invention is to provide a fuel cell utilizing a manifold system for distribution of dry or ambient unconditioned air through the cell, which system is compact and ensures better separation of the hydrogen and the air reactant gases in the cell.

A further object of this invention is to provide a manifold system for the flow of reactant gases through a fuel cell that prevents electrolyte solution, which is spilled out of the electrodes of the cell by cell flooding, from leaving the fuel cell system, and provides for the return of such spilled electrolyte to the matrix of the cell when the cell water balance is subsequently restored.

A further object of this invention is to provide a manifold system for the distribution of dry reactant gases through a fuel cell which utilizes countercurrent flow of the reactant gases to minimize local drying of the fuel cell and to provide for a more uniform electrolyte concentration in the cell.

Additional objects and advantages of the invention will be set forth in part in the description which follows, and in part will be obvious from the description or may be learned by practice of the invention, the objects and advantages being realized and attained by means of the instrumentalities and combinations particularly pointed out in the appended claims.

To overcome the problems inherent in the use of dry atmospheric air in the operation of fuel cells and to achieve the foregoing objects and advantages, and in accordance with its purpose, the present invention provide a manifold system for the distribution of the dry reactant gas through conventional trapped-electrolyte fuel cells that eliminates local drying and provides for more uniform electrolyte concentration in such cells.

As embodied and broadly described, the fuel cell of this invention comprises a fuel electrode, means for supplying fuel gas to the fuel electrode, an oxidant electrode, means for supplying oxidant gas to the oxidant electrode, and an aqueous solution of electrolyte separating the electrodes.

The gas supply means for supplying reactant gas to each of the respective electrodes includes a gas chamber adjacent the surface of each electrode having an inlet and an outlet port and being adapted to expose the electrode to the flow of reactant gas. In accordance with this invention, the inlet port of at least one of these chambers is located closely adjacent the outlet port of that chamber to prevent local drying of the fuel cell.

In accordance with the above system, dry or ambient unconditioned air or any other suitable reactant gas can be used in a fuel cell without the necessity of additionally treating it to increase its humidity.

By locating the inlet for the dry air closely adjacent the outlet and in close proximity to the electrode, in accordance with this invention it has been found that the drying and wetting characteristics of the cell can be greatly reduced and even eliminated, thereby minimizing the establishment of an electrolyte concentration gradient across the cell. By locating the air inlet adjacent the air outlet, the excess water in the wet air exit region of the cell is transported the relatively small distance through the electrolyte matrix to the dry air inlet region by capillary action, thereby uniformly distributing the water throughout the cell and minimizing a drying of the cell inlet.

The invention consists in the novel parts, constructions, arrangements, combinations and improvements as shown and described.

The accompanying drawings, which are incorporated in and constitute a part of the specification, illustrate one embodiment of the invention and, together with the description herein, serve to explain the principles of the invention.

It is to be understood that both the foregoing general description and the following detailed description are exemplary and explanatory but are not restrictive of the invention. Reference will now be made in detail to the presently preferred embodiment of the invention, an example of which is illustrated in the accompanying drawings.

Figure 2:
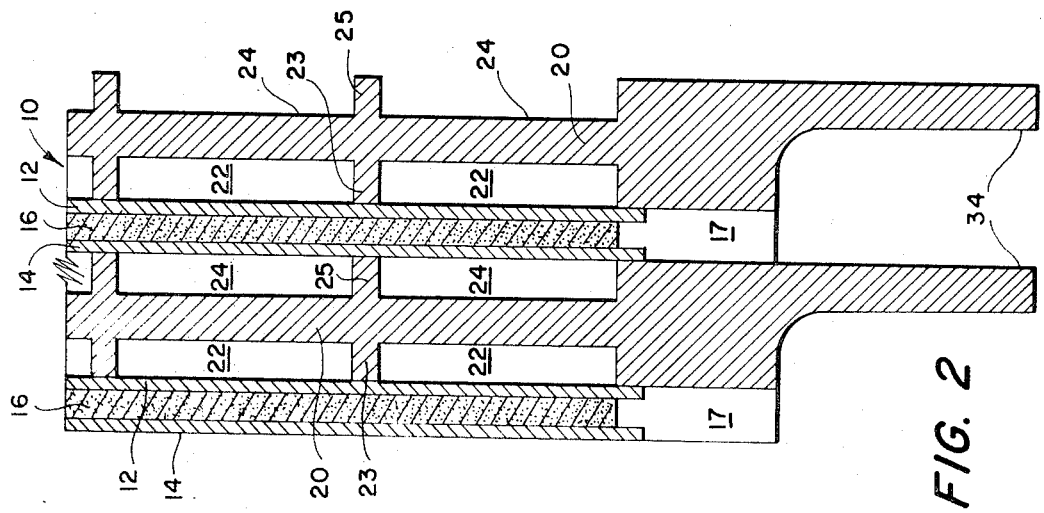
FIG. 2 is a fragmentary and enlarged sectional view taken along the line 2—2 of FIG. 1 showing the relationship of the fuel cell components.

The drawings illustrate a multi-cell fuel cell system made up of a plurality of compact fuel cells. There cells are designed to operate at low temperature of about 150 to 200° F. by the reaction of hydrogen and oxygen (supplied by either pure oxygen or air). The fuel cell components of the compact multi-cell fuel cell system generally indicated at 10 are suitably secured together in a gas tight relationship by suitable means such as bolts inserted through apertures 11 in the components. An individual fuel cell of the multi-cell system, as shown in FIG. 2, comprises spaced catalyzed screen electrodes 12 and 14 separated by a porous matrix 16 which is impregnated with an aqueous electrolyte solution. The electrodes 12 and 14 and the porous matrix 16 are secured within a suitable frame 17 to form a unitary plate for ease in construction of a multi-cell cell system. Successive electrodes 12 and 14 are electrically connected to provide the desired current flow of the cell.

The electrodes of the cell include a platinum or palladium catalyst dispersed throughout a Teflon binder and pressed or sprayed onto a fine mesh nickel screen having a thickness of about 0.06 inch. Catalyzed sintered electrodes can also be used with the fuel cell system of this invention.

The electrodes are each contacted by the aqueous electrolyte solution impregnated in matrix 16. The electrolyte solution is generally an aqueous solution of an alkali-metal hydroxide, preferably about 30% potassium hydroxide (KKOH) in an aqueous solution. Any alkali-metal hydroxide, however, can be substituted for potasium hydroxide as the electrolyte, including sodium hydroxide (NaOH), rubidium hydroxide (RbOH), cesium hydroxide (CsOH), and lithium hydroxide (LiOH). The invention is also applicable to fuel cells employing acidic electrolytes in which the screen electrodes are, for example, constructed of tantalum.

The matrix containing the electrolyte is suitably constructed of asbestos or any porous non-conducting material that is compatible with the electrolyte, and has a thickness of about 0.10 to 0.20 inch.

Cooling or gas manifold plates 20, having chambers or passageways 22 and 24 on either side of the plate for the circulation of reactant gases through the fuel cell, are located on either side of electrodes 12 and 14 of each cell.

A gas-electrolyte interface is located within each electrode 12 and 14. The location of each of the interfaces is controlled by the concentration of the electrolyte, and by the pressure under which the reactant gases are supplied to the cell.

In accordance with the preferred form of the invention, hydrogen, the fuel reactant gas, is fed to fuel electrode 12 through passage or chamber 22, and a hydrogen-electrolyte interface is established within fuel electrode 12. Dry or ambient unconditioned air is simultaneously supplied to oxidant electrode 14 through chamber 24, thereby establishing an electrolyte-air interface within oxidant electrode 14.

In accordance with this invention, means are provided for supplying dry oxidant reactant gas, preferably atmospheric air, to the oxidant electrode of the fuel cell and to remove product water formed by the cell reaction. These supply means prevent local drying of the cell and thereby enable a uniform electrolyte concentration to be maintained in the cell.

As embodied, this means comprises a manifold system for supplying dry air to the cell. In this manifold system the dry air follows a circuitous path from the inlet to the outlet of the air chamber and the inlet of the air chamber is disposed closely adjacent the exit of the air chamber. As specifically embodied and shown in FIG. 1, the reactant gas chamber, for example, air chamber 24 is provided with a center rib 25 making the chamber U-shaped, so that each dry air inlet 26 of the chamber is closely adjacent a wet air outlet 28. As further shown in FIG. 1, the cell can be provided with a plurality of U-shaped air chambers 24 for distributing the flow of air over the surface of oxidant electrode 14. The air is suitably supplied to the cell through an outer manifold 30 which communicates with air inlets 26, and is tremoved through an inner manifold 32 which communicates with air outlets 28.

In accordance with the invention, the path followed by the air in moving through the air chamber of the cell is U-shaped and folded back upon itself so that the driest air (at the air inlet) and the wettest air (at the air outlet) are directly adjacent each other in the air passage. This configuration ensures that the driving force toward creating equilibrium of moisture conditions within the cell is greatest where it is most needed (the region of the cell adjacent the air entrance and exit).

Figure 3:
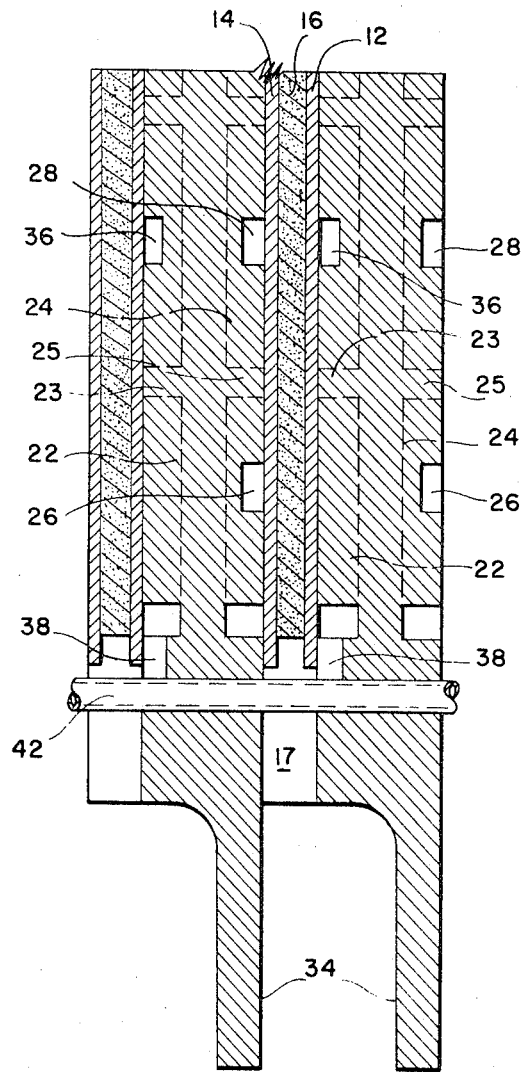
FIG. 3 is a fragmentary and enlarged split sectional view taken along the line 3—3 of FIG. 1.

In operation, and as best shown by reference to FIG. 3, when dry air enters the cell at air inlets 26, it begins to remove water from electrolyte matrix 16 through oxidant electrode 14, and a drying of the cell occurs near air inlets 26 because of the rapid rate of water removal in that area. As the air continues through chamber 24 in the direction indicated by arrows 27 (FIG. 1), it continues to absorb product water so that when it reaches air outlets 28, it is more nearly saturated and consequently has less tendency to absorb water from the system. This creates a wetting condition near cell air outlets 28 and a drying near cell air inlets 26. Since this absorption leaves less water in the cell near the air inlets than near the air outlets, a resulting concentration gradient would normally be expected to be established across the cell in the electrolyte matrix, with a higher concentration occurring near the air inlet.

Figure 1:
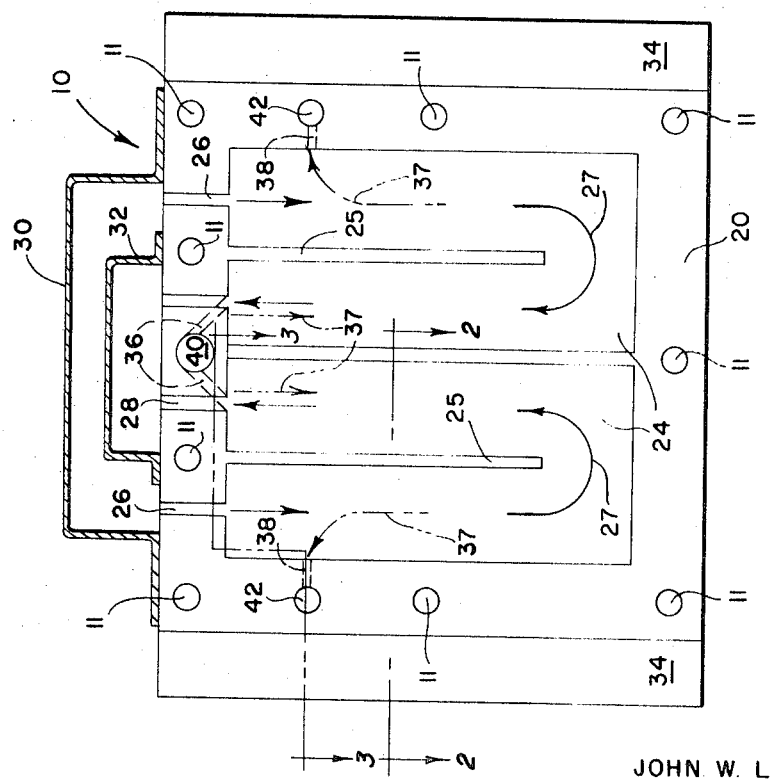
FIG. 1 is an elevational view of one face of a gas manifold plate constructed in accordance with this invention.

However, as shown in FIGS. 1 and 3, by arranging air inlet 26 closely adjacent air outlet 28 and utilized U-shaped air chambers 24 in accordance with this invention, the excess water at the wet exit region of the cell is transported across electrolyte matrix 16 the short distance between inlet 26 and outlet 28, thereby tending to equilibrate the moisture content throughout the cell. This movement of the water is effected by the capillary action of porous matrix 16 which draws the water from the wet area to the dry area of the cell.

By manifolding the gas across the surface of the electrode in U-shaped chambers 24, a supply of oxygen is suitably supplied to oxidant electrode 14 so that the electrochemical reactions of the cell can occur in the required manner, while at the same time the wet outlet for the oxidant gas is disposed closely adjacent the dry inlet area of the cell to maintain a uniform electrolyte concentration gradient across the cell.

In a fuel cell system which utilizes air as the oxidant gas, the use of the U-shaped chambers of this invention can effectively eliminate the need for saturators to provide humidity to the dry air prior to its entry into the cell. Additionally, this invention frees the system from the need for the complex controls required to establish the temperature gradient across the cell which must be used with such saturators to control the rate of removal of product water.

As shown in FIGS. 1 and 2, the U-shaped chambers can be contained in cooling or gas manifold plates 20 which separate the individual cells of a multi-cell fuel cell system. Cooling plates 20 are preferably constructed of metal and are provided with cooling fins 34 (FIGS. 2 and 3) for dissipating the heat generated in the cell. As embodied, the cooling plates 20 are provided on one side with the U-shaped air chambers 24, and on their other side with chambers 22 which distribute the flow of fuel gas to the next adjacent fuel cell of a multi-cell system.

Since it is unnecessary to maintain an oriented temperature gradient across the cells of this invention to control the rate of removal of product water, the internal cooling systems and the intricate controls necessary to maintain the proper temperature in prior art fuel cells utilizing saturators and the like are not needed. Thus, specific cell temperature gradients no longer need be maintained, and the heat generated in the cell can be efficiently eliminated by providing simpler cooling means, such as air fins 34 on cooling plates 20. Conventional internal cooling methods can, of course, also be used without the complex control requirements.

The objects of this invention are suitably and desirably accomplished by manifolding the flow of dry oxidant reactant gas to the oxidant electrode in the manner described above, so that the oxidant gas inlet is arranged closely adjacent to the oxidant gas outlet. However, it has been found that even further enhanced cell operation can be achieved by flowing the fuel gas, such as hydrogen, in a direction countercurrent to the direction of flow of the dry oxidant gas in the fuel cell.

Thus, in accordance with a preferred embodiment of the invention, means are also provided for flowing the hydrogen in a direction opposite to the direction of flow of air to the fuel cell, so that the hydrogen enters the cell directly opposite and on the other side of the electrolyte matrix from the wet air outlet of the fuel cell.

As embodied, hydrogen chambers 22 are also U-shaped, having a central rib 23 (FIG. 3). Chambers 22 have an inlet 36 connected to a supply of hydrogen through an inlet conduit 40 (FIG. 1) and an outlet 38 connected to an outlet conduit 42.

As shown in FIGS. 2 and 3, hydrogen chambers 22 are directly behind and on the opposite side of coolant plates 20 from U-shaped air chambers 24. The hydrogen flows through chambers 22 (as indicated by arrows 37) countercurrent to the direction in which the air flows through chambers 24 (as indicated by arrows 27) on the opposite side of the plates 20, and on the opposite side of the matrix of one cell of the multi-cell system. Fuel inlet 36, as shown in FIG. 3, is located directly opposite and across electrolyte matrix 16 from outlet 28 of the air chambers, so that hydrogen enters the cell near where the wet air is exiting. The fuel outlet 38 is located across the electrolyte and near the air inlet 26.

In accordance with a further preferred embodiment of this invention, means are also provided for retaining in the cell any electrolyte which is forced out of the electrolyte matrix by cell flooding. In this preferred embodiment, the U-shaped reactant gas supply chambers 22 and 24 are oriented in a vertical direction, as shown in FIG. 1, so that the inlet and outlet ports of each chamber are located at or near the top of the cell.

The bend of U-shaped chambers 22 and 24, at the bottom of the cell, will then form a pool for any excess electrolyte which may flow out of the cell matrix and the porous electrode due to the presence of excess water in the cell. When the water balance in the system is restored, the electrolyte at the bottom of the gas chambers 22 and 24 will be drawn, by capillary action, up through the electrolyte matrix 16 and the electrodes 12 and 14 to re-establish a uniform electrolyte concentration. This cell structure therefore prevents the electrolyte from spilling out of the cell and being permanently lost or causing damage to other system components.

The advantages of this invention can also be achieved in a closed loop hydrogen-pure oxygen fuel cell. In this type of fuel cell, excess hydrogen or another suitable fuel gas is recycled through the cell to remove product water.

By recirculating hydrogen or the like through U-shaped fuel gas chambers, in accordance with this invention, with the fuel gas inlet closely located adjacent the fuel gas outlet, excess product water which accumulates near the fuel outlet of the fuel chamber tends to be transported to the vicinity of the fuel inlet, in the same manner as discussed above, thereby tending to equilibrate the water content throughout the cell.

The manifold system of this invention can therefore be used with any trapped-electrolyte fuel cell that has a local drying problem created by the use of a relatively dry reactant gas, regardless of whether the product water is removed by recirculation of the fuel reactant gas or in the exiting oxidant reactant gas.

While the invention is described with respect to a compact fuel cell, it is to be understood that this invention, in its broadest form, also contemplates the use of the novel manifold system with intermediate temperature Bacon-type fuel cells, which may also use a trapped-electrolyte and exhibit local drying problems. It is also to be understood that this invention in its broadest form is suitable for use with all gas-fed fuel cell systems, using either hydrogen or other suitable fuel reactant gases, and any suitable oxidant reactant gases, including pure oxygen and air.

Thus, in accordance with this invention, a new and improved manifold system for the distribution of dry reactant gas streams within fuel cells is provided. This system prevents a drying-out of the cell while achieving a reduction in the weight of the entire fuel cell system and an elimination of the complexity of operation which characterizes prior art fuel cell systems.

The invention in its broader aspects is not limited to the specific details shown and described, but departures may be made from such details within the scope of the accompanying claims without departing form the principles of the invention and without sacrificing its chief advantages.

What is claimed is:

1. A fuel cell having a fuel electrode, an oxidant electrode, an aqueous electrolyte retentive matrix disposed between the electrodes, means for supplying fuel reactant gas to the fuel electrode, means for supplying oxidant reactant gas to the oxidant electrode, at least one of said reactant gas supply means comprising a gas chamber adjacent the surface of its electrode, said gas chamber having an inlet port, an outlet port, and means for distributing the flow of reactant gas over the surface of said electrode in a circuitous path between the inlet and outlet, said inlet and outlet ports being located closely adjacent each other with respect to the path followed by the gas flowing through the chamber and in close proximity to the electrolyte matrix so that water from the wettest region of the cell near the outlet can readily migrate through the electrolyte matrix to the driest region of the cell near the inlet to prevent a local drying-out of the electrolyte matrix in the region adjacent the inlet port.

2. A fuel cell having a fuel electrode, an oxidant electrode, an aqueous electrolyte retentive matrix disposed between the electrodes, means for supplying fuel reactant gas to the fuel electrode, and means for supplying oxidant reactant gas to the oxidant electrode, said oxidant gas supply means including at least one gas chamber adjacent the surface of the oxidant electrode, said gas chamber having an inlet port, an outlet port, and means for distributing the flow of oxidant gas over the surface of the oxidant electrode in a circuitous path between the inlet and outlet, said inlet and outlet ports being located closely adjacent each other with respect to the path followed by the oxidant gas flowing through the chamber and in close proximity to the electrolyte matrix so that the water from the wettest region of the cell near the outlet can readily migrate through the electrolyte matrix to the driest region of the cell near the inlet to prevent a local drying-out of the electrolyte matrix in the region adjacent the inlet.

3. The fuel cell of claim 2, in which the gas chamber in U-shaped.

4. The fuel cell of claim 3, in which the U-shaped chamber is vertically oriented with the inlet port and outlet port being located near the top of the cell.

5. The fuel cell of claim 2, which includes an oxidant gas manifold having a pulrality of gas chambers adjacent the surface of the oxidant electrode and adapted to distribute the flow of oxidant gas over the oxidant electrode, each of said gas chambers having an inlet port, an outlet port, and means for distributing the flow of oxidant gas over the oxidant electrode in a circuitous path between the inlet and outlet ports, said inlet and outlet ports of each chamber being located closely adjacent each other and in close proximity to the electrolyte to prevent a local drying-out of the cell in the region adjacent each inlet port.

6. The fuel cell of claim 5, in which the chambers are U-shaped.

7. The fuel cell of claim 6, in which the U-shaped chambers are vertically oriented with their inlet and outlet ports located near the top of the cell.

8. The fuel cell of claim 5, which includes a fuel manifold plate adjacent the surface of the fuel electrode and having a plurality of U-shaped chambers for exposing the fuel gas to the surface of the fuel electrode, each of said chambers having an inlet port and an outlet port, said fuel inlet ports being located directly opposite and on the other side of the electrolyte from the oxidant gas outlet ports.

9. A compact fuel cell designed to operate at a temperature of about 150 to 200° F. by the reaction of hydrogen with dry air, the cell having a fuel electrode, an oxidant electrode, an aqueous alkali-metal electrolyte impregnated matrix disposed between and in contact with the electrodes, means for supplying hydrogen to the fuel electrode and means for supplying air to the oxidant electrode, said air supply means including an air manifold plate having a plurality of U-shaped chambers for supplying the air to the surface of the oxidant electrode, each of said U-shaped chambers having an inlet port and an outlet port located closely adjacent each other and in close proximity to the electrolyte matrix to prevent a local drying-out of the cell in the region adjacent each inlet port.

10. The compact fuel cell of claim 9, which includes a fuel manifold plate adjacent the surface of the fuel electrode and having a plurality of U-shaped chambers for supplying hydrogen to the surface of the fuel electrode, each of said chambers having an inlet port and an outlet port, said hydrogen inlet ports being located directly opposite and across the electrolyte from the outlet ports of the air chamber.

11. A multi-cell fuel cell system comprising a plurality of cells, each cell having a fuel electrode, an oxidant electrode, and an aqueous electrolyte impregnated matrix disposed between the electrodes, a gas manifold plate separating each cell of the system, each of said plates having a plurality of U-shaped chambers on one of its sides for supplying reactant fuel gas to the fuel electrode of one cell in said system, and a plurality of distinct U-shaped chambers on the other side of each plate for exposing oxidant reactant gas to the oxidant electrode of the next adjoining fuel cell, wherein the inlet of each oxidant gas chamber is located closely adjacent the outlet of each oxidant gas chamber and in close proximity to the electrolyte matrix, and the inlet of each fuel gas chamber of each cell is directly opposite and across the electrolyte from the outlet of eatch oxidant gas chamber.

12. The system of claim 11, which has cooling fins on the gas manifold plate which extend beyond the cells and dissipate the heat generated in the fuel cell reactions.

13. The system of claim 11, in which the U-shaped chambers on both sides of the manifold plate are vertically oriented, with the inlets and outlets of the chambers both being located near the top of the cell.

References Cited
UNITED STATES PATENTS

| | | | |
|---|---|---|---|
| 409,366 | 8/1889 | Mond et al. | 136—86 |
| 3,101,285 | 8/1963 | Tantram et al. | 136—86X |
| 3,116,170 | 12/1963 | Williams et al. | 136—86 |
| 3,146,131 | 8/1964 | Linden et al. | 136—86 |
| 3,160,528 | 12/1964 | Dengler et al. | 136—86 |
| 3,236,691 | 2/1966 | Reger et al. | 136—86 |
| 3,298,867 | 1/1967 | Diotalevi | 136—86 |
| 3,432,353 | 3/1969 | Von Krusenstierna et al. | 136—86 |
| 3,435,272 | 4/1969 | Getting | 136—86 |

ALLEN B. CURTIS, Primary Examiner